United States Patent [19]

Leiser et al.

[11] 4,308,309

[45] Dec. 29, 1981

[54] ADJUSTABLE HIGH EMITTANCE GAP FILLER

[76] Inventors: Robert A. Frosch, Administrator of the National Aeronautics and Space Administration, with respect to an invention of Daniel B. Leiser, San Jose; David A. Stewart, Santa Cruz; Marnell Smith, San Jose; Carlos A. Estrella, Santa Clara; Howard E. Goldstein, Saratoga, all of Calif.

[21] Appl. No.: 147,700

[22] Filed: May 7, 1980

[51] Int. Cl.$^3$ .................... B32B 23/02; F42B 11/00
[52] U.S. Cl. .................... 428/193; 102/289; 244/121; 244/158 A; 244/160; 428/49; 428/192; 428/241; 428/242; 428/245; 428/251; 428/257; 428/260; 428/266; 428/447; 428/448
[58] Field of Search ............ 428/49, 192, 193, 210, 428/241, 242, 245, 266, 447, 448, 251, 257, 240, 260, 262; 244/121, 158, 160; 102/105

[56] References Cited

U.S. PATENT DOCUMENTS

| | | | |
|---|---|---|---|
| 2,815,300 | 12/1957 | Smith | 428/260 |
| 3,920,339 | 11/1975 | Fletcher | 244/121 |
| 4,124,732 | 11/1978 | Leger | 428/49 |
| 4,137,355 | 1/1979 | Heaps et al. | 428/210 |
| 4,223,064 | 9/1980 | Bally et al. | 428/246 |

Primary Examiner—James J. Bell
Attorney, Agent, or Firm—Darrell G. Brekke; John R. Manning

[57] ABSTRACT

A flexible, adjustable refractory filler (1) is disclosed for filling gaps between ceramic tiles (10, 11) forming the heat shield of a space shuttle vehicle, to protect its aluminum skin (20) during atmospheric re-entry. The easily installed and replaced filler (1) consists essentially of a strip of ceramic cloth (3) coated, at least along both its longitudinal edges (4, 5), with a room temperature vulcanizable silicone rubber compound with a high emittance colored pigment. The filler may have one or more layers (2, 3), as the gap width requires. Preferred materials are basket-weave aluminoborosilicate cloth, and a rubber compounded with silicon tetraboride as the emittance agent and finely divided borosilicate glass containing about 7.5% $B_2O_3$ as high temperature binder. The filler cloth strip or tape is cut to proper width and length, inserted into the gap, and fastened with previously applied drops of silicone rubber adhesive.

8 Claims, 3 Drawing Figures

U.S. Patent  Dec. 29, 1981  Sheet 1 of 2  4,308,309
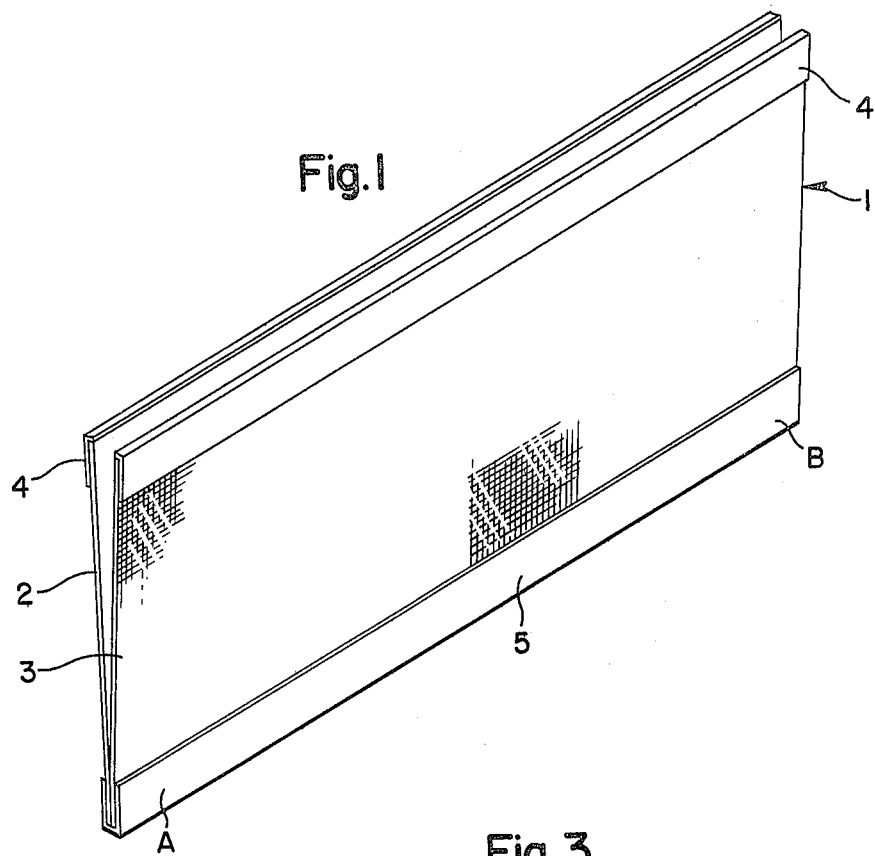
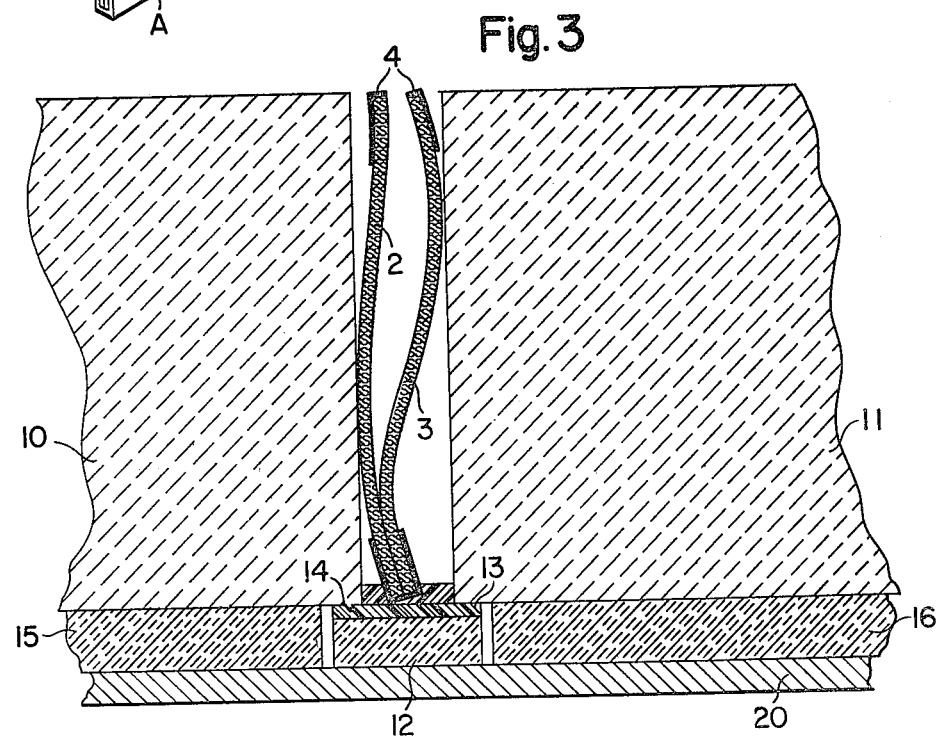

ADJUSTABLE HIGH EMITTANCE GAP FILLER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 453; 42 U.S.C. 2457).

TECHNICAL FIELD

This adjustable high emittance gap filler is primarily intended for insertion into already existing gaps between the reusable heat shield tiles on a space shuttle vehicle to prevent possible overheating during entry into the earth's atmosphere.

BACKGROUND ART

The conventional gap filler used to protect a space shuttle vehicle from overheating during re-entry in the earth's atmosphere consists of pads made from aluminoborosilicate cloth filled with alumina fibers. The cloth is sewn together in the form of a pillow to hold the refractory fibers. The pad is constructed in several sizes ranging from 0.1 to 0.2 inch in thickness, although its flexibility may allow additional alteration by in situ compression. Its applicability to the vehicle, however, is seriously limited because of the impossibility of fabricating specimens of less than 0.1 thick. The filler pad of the art is installed in the tile gaps and attached by a "velcro" strip fastened to the pad's base, said strip engaging another "velcro" strip clipped under the vehicle tiles. Alternatively, the pad is trapped between tiles by overhangs on adjacent tiles which prevent it from coming out of the gap.

This conventional gap filling system therefore suffers from various shortcomings which may be summarized as follows. Gaps less than 0.1 inch wide cannot be filled, leaving a large number of vulnerable points in the heat shield. The tiles made with overhangs must be designed to accept the filler, thus eliminating the possibility of refilling the gaps when the filler has been damaged. Finally, the low emittance of the conventional filler may cause, in larger gaps, high filler surface temperatures during entry into the atmosphere, a phenomenon which may adversely affect the filler's reusability and the safety of the flight as well.

The primary objective of this invention is to provide a filler which will effectively prevent hot gas flow between heat shield tiles and thus prevent overheating of the underlying aluminum structure of the vehicle, while at the same time allowing sufficient space for thermal expansion and contraction during orbital operations.

Another objective is to provide simple means by which small gaps of various lengths and widths between ceramic tiles of a space vehicle heat shield can be custom fit with a filler without having to remove the surrounding tiles to close said gaps. A further objective is to provide a filler which, if necessary, can be replaced between flights, again without removal of vicinal tiles.

DISCLOSURE OF INVENTION

The objects of the invention have been achieved by forming a strip of ceramic cloth of one or several superimposed layers, coated or impregnated with a high emittance, i.e., having a total hemispheric emittance $\geq 0.7$, composition comprising a silicone rubber, that can be cured at room temperature, a borosilicate glass containing about 7% by weight of boron oxide, and a high emittance pigment. The preferred materials for maximum temperature resistance include a basket-weave aluminoborosilicate cloth, a silicone rubber that is free from iron oxide filler, a borosilicate glass containing between about 7.25 and 7.75% $B_2O_3$, and silicon tetraboride as the high emittance pigment.

Several different gap filler embodiments can be designed with the type of materials just listed and they shall be described in greater detail presently. In any case however, the selected cloth strip is inserted into the gap to be filled and fastened with a few spots of room temperature vulcanizing silicone rubber. If for any reason after one or more flights the gap filler has to be replaced, it can be removed easily without having to disturb the tiles vicinal to the gap.

BRIEF DESCRIPTION OF THE DRAWINGS

The details of the invention will be described partly in connection with the accompanying drawings, in which FIG. 1 represents in perspective an embodiment of the gap filler, FIG. 3 is a cross-sectional view of a gap filler installed in a heat shield gap.

DETAILED DESCRIPTION OF THE INVENTION

Figure 2:
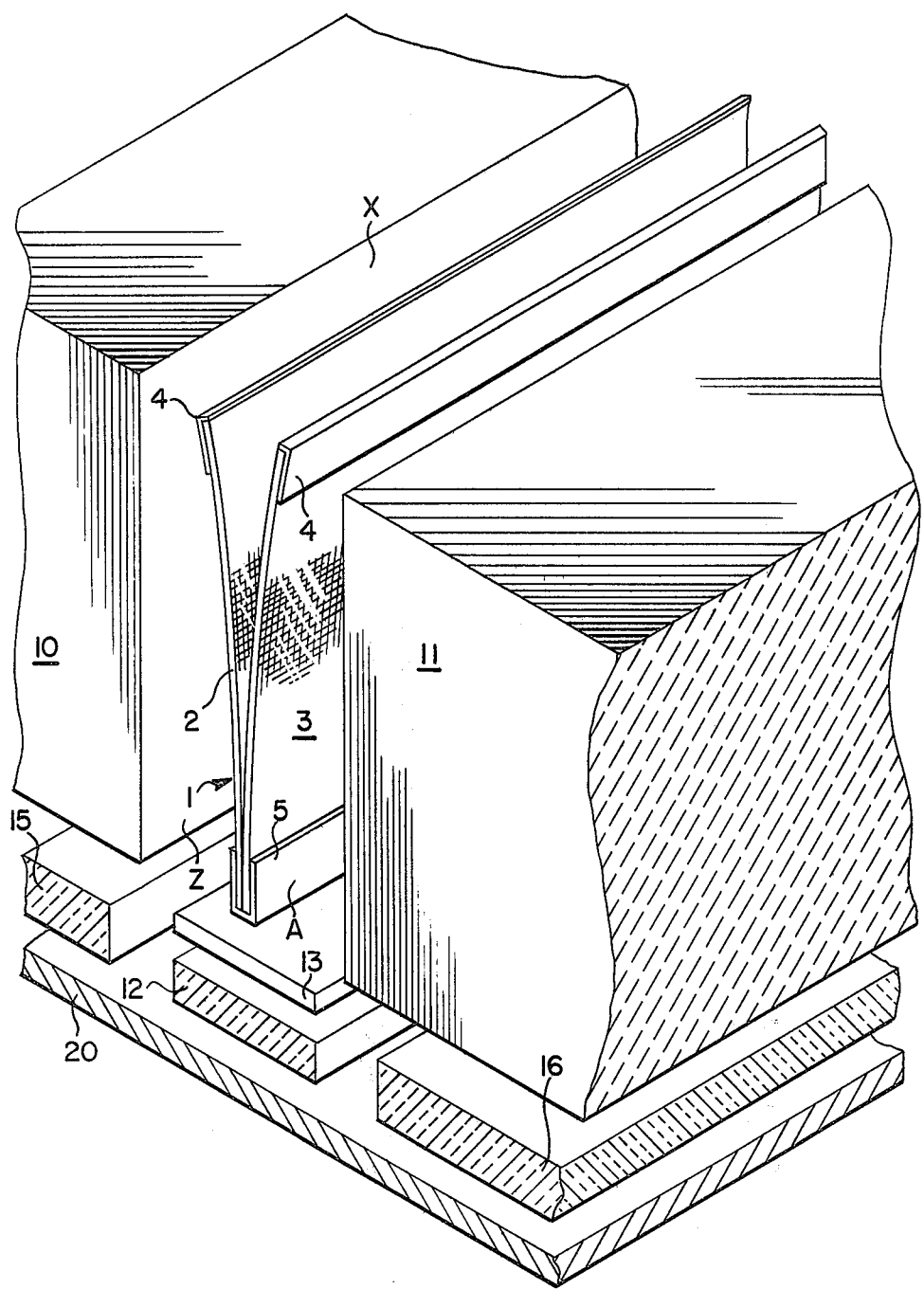
FIG. 2 shows an exploded perspective view of a gap filler and ceramic tile assembly.

Referring to the drawings, an embodiment of a gap filler 1 is shown in FIG. 1, which comprises two elongated layers of ceramic cloth 2 and 3, each layer having been coated or impregnated along one of its longitudinal edges with a high emittance composition to form a heat radiating strip 4, and each layer having been further coated or impregnated along its opposite longitudinal edge with a heat resistant polymeric preparation to form a transfer coating strip 5 which serves to attach gap filler 1 in the gaps between ceramic heat shield tiles. Although coatings 4 and 5 are shown as distinct layers on cloth strips 2 and 3 in the figures, it should be realized that in actual practice, desirable impregnation of cloth by coatings occurs, no matter how the coatings are applied. Sheets 2 and 3 of gap filler 1 are shown partly separated to facilitate visualization of the structure. In actual practice, no separation exists between the cloth layers.

FIGS. 2 and 3 show gap filler 1 inserted between two heat shield ceramic tiles 10 AND 11. FIG. 2 shows an exploded perspective view of the assembly while FIG. 3 presents a cross-sectional view of the same assembly as it exists on the aluminum space vehicle skin 20.

The gap between two tiles 10 and 11, which has been exaggerated for illustrative purpose, is filled by inserting filler element 1 into it so that the edge to which the polymeric transfer coating 5 has been applied, rests on a polymeric filler bar 12 coated with a silicone rubber adhesive layer 13 (FIG. 3) identical to or compatible with transfer coating 5 of the filler element. A drop of silicone rubber adhesive 14 (FIG. 3) is placed by means of a hypodermic needle into the gap on the coated filler bar 12 in order to fasten the gap filler at several spots along its bottom edge, for example, at each of its extremities A and B. This type of limited fastening is sufficient to hold the filler in place and yet allows easy removal of damaged filler when replacement is necessary. As shown in the drawings, tiles 10 and 11 rest on polymeric pads 15 and 16 placed on the metallic skin 20 of the vehicle, each of the components being fastened together by suitable adhesives (not shown). Pads 15 and 16 are smaller in area than the base surface of the tiles resting on them, thus creating a recessed strip into which filler bar 12 fits to form a secure waterproof seal with the superposed tile (FIG. 3).

As shown in the drawings just described, the preferred adjustable high emittance gap filler of the invention consists essentially of three parts: a cloth filler material and two coatings. One of the coatings is a high emittance permanent coating that is ultimately placed at the open end of the gap between tiles. The other coating is a transfer coating applied to the opposite edge of the gap filler to facilitate the handling and the installation of the filler in the gap.

It should be noted here that although the gap filler described in FIG. 1 shows two distinct and opposite coated or impregnated strips (4 and 5), it has been found expedient, from the manufacturing point of view, to impregnate the entire cloth with either the high emittance coating compound or the transfer coating compound. In such instances, however, the performance of the coating when subjected to the gas plasma encountered during re-entry in the atmosphere, will vary according to the emittance value of the inorganic material selected to accomplish this function.

The cloth that constitutes the basic filler material is a ceramic cloth, preferably a basket-weave aluminoborosilicate fiber construction. Other cloth compositions and weaves may be used in applications where the temperature resistance requirements are less demanding. Such alternative ceramic fiber materials include astroquartz, S-glass, E-glass, refrasil, black aluminoborosilicate and the like.

Both the high emittance coating and the transfer coating are basically polymeric in nature comprising generally a silicone rubber and some particulate ceramic or metallic filler. The silicone rubber component, preferably of the type that can be cured at ambient temperatures, serves to bond the coating that contains it to the cloth and to bond the coated cloth to the filler bar in the tile gap. Also, it fulfills the additional function of bonding the loose fibers produced when the ceramic cloth is cut to the exact contour of the gap to be filled, thus preventing the unraveling of said cloth. The most satisfactory material for the purposes just described is basically a dimethyl silicone polymer. Optionally, some of the methyl groups in the dimethyl silicone polymer may be replaced by phenyl groups in order to improve resistance to high temperatures.

The particulate ceramic or metallic filler comprised in the coatings provide the gap filling structure with the high temperature properties that are needed when the silicone rubber is oxidized during entry into the earth's atmosphere. Among said properties are the raising of the gap filler structure's total hemisperical emittance to 0.9, for best performance, and the bonding of the coating to the cloth at such higher temperatures and for purposes of reusability. Particulate substances that will accomplish these objectives include silicon tetraboride, silicon hexaboride, other boron silicides, boron, as well as various other colored refractory oxides such as iron oxide and chromium oxide that can be used where optimum emittance is not required. A particulate borosilicate glass is advantageously incorporated in the high emittance coating, the preferred material in this class being "Vycor" 7930, a porous high silica glass such as described in U.S. Pat. No. 2,286,275 but which contains, for the present purposes, a boron oxide level of 7.25 to 7.75% by weight. This type of glass is compatible with the coating already existing on the surface of the reusable surface insulation (RSI) tiles of a space shuttle vehicle, and it fuses at a temperature low enough to permanently attach the high emittance coating to the cloth gap filler, thus protecting the high emittance pigment from the oxidizing aeroconvective heating environment of atmospheric entry. Similarly, the preferred emittance agent has been found to be silicon tetraboride because of its stable performance in aeroconvective environments, its compatibility with the RSI tile coating and its high emittance. The RSI tile coating has been described in detail in U.S. Pat. No. 4,093,711.

In addition to the components already mentioned, the coating preparation may contain enough of a solvent such as toluene to reduce the viscosity for application by means of a spray gun.

In short, the exact composition of the coating compounds may vary significantly since the nature and quantity of particulate filler, the cloth filler itself, and the specific polymer chosen depend upon the specific requirements of the gap to be filled. Specific formulations that are preferred for various applications will be described in the examples.

The gap filler of the invention can be constructed by first cutting the ceramic cloth material to the size required, e.g. rectangular strips 3" wide by 36" long. A cloth of such dimensions might be selected to fill gaps that are between 1.5" and 2" deep. Another size of cloth would be needed for gaps within another practical depth range. In any event, once the cloth has been cut, it is impregnated along one of its longitudinal edges with a slight excess of high emittance coating, using a spatula to force the coating compound into the cloth and a mask to limit the compound's penetration area so that an impregnated strip 0.5 to 1.0 inch wide is formed. The opposite longitudinal edge of the cloth is then impregnated in the same manner and to the same extent with a transfer coating compound. The cloth thus impregnated is then pressed between two sheets of plexiglass treated with a release agent, using a shim of controlled thickness to establish the thickness of the resultant gap filler. After the silicone rubber has set, the filler is removed from the plexiglass mold and is stocked as a standard part for final sizing. Other fillers can be prepared in the same manner, using different shims and a different number of cloth layers to obtain fillers of different thickness.

Gap filler stock can also be made from standard four inch wide ceramic tape with closed longitudinal edges. To prepare such filler, a slight excess of high emittance coating compound is worked into the cloth using masking strips along its longitudinal edges so that an impregnated strip about 2 inches wide is formed along the center line of the cloth tape. The outer one inch wide areas previously masked are then impregnated in the same manner and to the same extent with a transfer coating compound. One or more layers of the resulting tape are then pressed between two sheets of plexiglass with a shim of controlled thickness to obtain the stock product. The details of this operation have already been described in the previous paragraph. A tape impregnated in this manner should accommodate, after precise tailoring, folding and/or laminating, gaps with a depth ranging from 1½ to 3 inches.

The final sizing of the stock filler is completed, in the end, by first measuring very carefully the width, depth, and length of the gap to be filled. The filler thickness is then defined for a specific gap by allowing approximately 20 mils of minimum clearance throughout the length and width of the gap. A standard thickness gap filler is cut to fill a gap that has a fairly uniform width. In cases where the gap width is not uniform, however, a custom gap filler is prepared either by using a combination of standard gap fillers cut and bonded together with additional coating at appropriate places, or by making a filler with shims of several different thicknesses to obtain a filler of varying thickness. The exact profile or height of the filler can be determined by placing a template in the gap to be filled and cut said template to define the inner and outer mold lines of the gap. The actual filler, standard or custom, is then cut to match the template shape by removing excess material from the silicone coated edges with a pair of scissors.

To install the trimmed filler, a drop of room temperature curing silicone rubber adhesive is placed by means of a hypodermic needle on the filler bar at locations that will permit sufficient contact between the transfer coating of the element and the filler bar (e.g. at points A and B on FIGS. 1 and 2) after it is inserted in the gap. The filler is then inserted between two shims, said shims preventing any adhesive contact with the tiles. After the adhesive rubber has cured, the installation should be tested by pulling on the filler to check adhesion. This method of installation not only provides sufficient adhesion of the filler to the filler bar, but also allows easy removal after a flight, when necessary, by using a tool containing a razor blade to cut the cured rubber at spots of contact (FIG. 1).

An alternative method of installation can be used which involves the application of a bead of silicone adhesive with a hypodermic needle along the entire length of the gap to be filled. A filler element so attached is obviously more secure but it is also more difficult to remove and replace.

The new gap filler and its performance shall now be illustrated in operational detail by the following examples which are not intended to limit the scope of the invention as stated in the appended claims.

EXAMPLE 1

An adjustable high emittance gap filler was made with a basket-weave aluminoborosilicate cloth of 12 mils average thickness as the basic filler material. The cloth strips were coated with a mixture comprising ten parts by weight of a low viscosity silicone rubber potting compound, ten parts of a modified porous high silica "Vycor" glass powder, one part of high purity tetraboron silicide, and 0.1 part of dibutyl tin dilaurate as catalyst.

The cloth employed was made from a fiber produced and woven by the 3-M Company known as AB-312 which contains about 62% $Al_2O_3$, 14% $B_2O_3$, and 24% $SiO_2$ on a weight basis. The silicone potting compound used was a transparent low viscosity material that can cure at room temperature and is commerically available as RTV-602. It is a dimethylsilicone with a 25° C. viscosity of 800-1500 cps, a solids content of 100%, and a refraction index of 1.406 at 25° C. The glass used in this preparation is a 325 mesh powder made principally of about 91% silicon dioxide and about 7.25 to 7.75% boron oxide. The tetraboron silicide used is an AA grade, a high purity material containing only 3% free silicon.

The coating mixture just described was impregnated into the entire cloth using a spatula, a plexiglas mold and shims to set the resultant filler thickness. No standard depth grouping of the fillers nor any separate transfer coating are required for this particular gap filler construction. After the silicone rubber had set, the filler was cut up to the contour of the gap and installed as previously described.

EXAMPLE 2

A gap filler was prepared as in Example 1 by total impregnation, but with a silicone rubber potting compound that did not contain any borosilicate glass nor any tetraboron silicide. It did contain instead finely divided iron oxide ($Fe_2O_3$) which gave it a characteristic red color. The compound used is available as RTV-560, a partially phenyl substituted dimethyl silicone and has a 25° C. viscosity of 400 poises (Brookfield RVF model, No. 5 spindle, 4 rpm), a non-volatile content of 98%, and a specific gravity of 1.42 at 25° C.

The gap filler thus prepared has a lower emittance than that of Example 1 due to the presence of iron oxide as opposed to tetraboron silicide. It is useful however at temperatures up to about 2400° F. for limited periods of time.

EXAMPLE 3

A gap filler was constructed with two layers of strip coated cloth in the manner of the embodiment described in FIG. 1. The coatings were applied with the assistance of a template. Two different coating mixtures were used: the high emittance mixture of Example 1 for strip 4 of the filler (FIG. 1) and the iron oxide mixture of Example 2 as a transfer coating (strip 5 of FIG. 1). The cloth was the preferred basket-weave aluminoborosilicate already used. Cloth lengths of equal widths were assembled together with mold and shims and bonded at the bottom, as already described to yield the final gap filler that can be seen in the drawings.

EXAMPLE 4

In this construction, the same materials and techniques were used as in Example 3, except that the cloth lengths were of unequal width which were bonded both at the top and at the bottom, thus creating a bowing or bulge on the wider side of the cloth assembly. This construction favors the collapsing of cloth layers against the walls of the gap and thus tends to be more effective in interrupting the flow of hot plasma into the filled gap.

Gap fillers fabricated in the manner of Examples 3 and 4 and installed in an 0.065 inch gap were tested in a 20 megawatt arc-jet facility. The high emittance impregnated strips on each filler were 0.5 inch wide and the total thickness of the impregnated area was 0.040 inch for the two unsealed layers of Example 3 and 0.033 inch for the impregnated area of the sealed-together layers of Example 4.

The gap to be tested, filled or unfilled, is placed at a 15° angle to the plasma stream created by hypersonic semielliptical nozzle upstream of the test article. The test article configuration provides pressure gradient across the length of the gap. A gap surface temperature of 1960° F. is maintained (point x, FIG. 2) and the tile wall temperature profile (between points x and z, FIG. 2) is recorded at 350 seconds into the heat pulse at a pressure gradient of 52 psf/ft ($\Delta P/\Delta X$). In addition to gaps filled with the filler elements of Examples 3 and 4, these were also tested, for comparison purposes, an open gap without filler, and an Inconel filler consisting of a 0.006 inch thick Inconel shim with pressure springs. The results of these tests in terms of the temperatures reached at the bottom of the gap (point z, FIG. 2) can be summarized as follows. In the case of a gap filled with either Example 3 and the Example 4 product, the temperature of about 225° F. was recorded, which is about 1000° F. lower than the 1270° F. measured at the same place in an unfilled gap. This improvement is much superior to that achieved by the Inconel filler which only lowered the gap bottom temperature to 900° F. for an improvement of only about 370° F.

Similar tests with a pressure gradient of $\Delta P/\Delta X = 130$ psf/ft, showed the Examples 3 and 4 fillers to be superior by about 360° F. to a composite filler consisting of an 0.012 inch thick rolled silica cloth attached to an 0.006 inch thick stainless steel shim stock with copper eyelets. Under these less demanding conditions, a cloth filled gap, i.e. tiles pressed tightly against two silica cloth layers, performed as well as the fillers of the invention. It should be noted however that this cloth fill approach does not constitute a practical means for field installation and removal of tile gap filler.

The gap filler of the invention can be used in ceramic applications involving narrow gaps and high temperature gases that are likely to heat the underlying non-ceramic structures either by radiation or by convection.

What is claimed is:

1. A high emittance insulating structure for filling gaps between ceramic tiles, consisting of at least one layer of an aluminoborosilicate fiber ceramic cloth impregnated with liquid room temperature curing silicone rubber comprising a particulate inorganic substance having a total hemispherical emittance $\geq 0.7$.

2. The structure of claim 1 wherein the aluminoborosilicate fiber ceramic cloth is a basket weave cloth about 10 mils thick.

3. The structure of claim 1 wherein the silicone rubber is a dimethyl silicone polymer.

4. The structure of claim 1 wherein the particulate inorganic substance is an iron oxide.

5. The structure of claim 2 consisting of two layers of the aluminoborosilicate cloth completely impregnated with the liquid silicone rubber.

6. A high emittance insulating structure for filling gaps between ceramic tiles, consisting of at least one layer of a ceramic cloth impregnated with a liquid room temperature curing silicone polymer rubber compounded with a particulate inorganic substance having a total hemispheric emittance $\geq 0.7$ and comprising a finely divided borosilicate glass containing about 7% by weight of boron oxide and a high emittance pigment.

7. The structure of claim 6 wherein the room temperature curing silicone rubber is a dimethyl silicone polymer and is compounded with an equal weight of a finely divided borosilicate glass containing about 7.5% $B_2O_3$ and one tenth of its weight of a particulate inorganic substance selected from the class consisting of tetraboron silicide, hexaboron silicide and boron.

8. The structure of claim 7 consisting of two layers of the aluminoborosilicate cloth impregnated along one longitudinal edge with the tetraboron silicide-containing silicone rubber, and along the opposite longitudinal edge, with an iron oxide-containing silicone rubber transfer coating mixture.

* * * * *